(12) United States Patent  
Brants et al.

(10) Patent No.: US 8,762,128 B1
(45) Date of Patent: Jun. 24, 2014

(54) BACK-TRANSLATION FILTERING

(75) Inventors: Thorsten Brants, Palo Alto, CA (US); Jan Pfeifer, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 442 days.

(21) Appl. No.: 13/149,838

(22) Filed: May 31, 2011

Related U.S. Application Data

(60) Provisional application No. 61/488,554, filed on May 20, 2011.

(51) Int. Cl.
G06F 17/28 (2006.01)

(52) U.S. Cl.
USPC ..................... 704/2; 704/5; 704/277

(58) Field of Classification Search
USPC ................ 704/1–10, 251, 255, 270, 277, 257
See application file for complete search history.

(56) References Cited

U.S. PATENT DOCUMENTS

| 7,848,915 | B2* | 12/2010 | Gao et al. | 704/2 |
| 2008/0208565 | A1* | 8/2008 | Bisegna | 704/4 |
| 2009/0157386 | A1* | 6/2009 | Zhou | 704/9 |

* cited by examiner

Primary Examiner — Huyen X. Vo
(74) Attorney, Agent, or Firm — Remarck Law Group PLC

(57) ABSTRACT

A translation system receives a test pair that includes a source test phrase in a first language and a target test phrase in a second language. The test pair can be evaluated by comparing its components with phrases in primary pairs. The test source phrase can be compared to a primary source phrase that is the phrase most commonly translated by the machine translation system into the test target phrase. The test target phrase can be compared to a primary target phrase that is the phrase into which the target source phrase is most often translated. If one and/or both comparisons are sufficiently dissimilar, the machine translation system can be modified by deleting the test pair, by flagging it for human review, or in other ways.

20 Claims, 4 Drawing Sheets

BACK-TRANSLATION FILTERING

CROSS-REFERENCE TO RELATED APPLICATIONS

This application claims priority to U.S. Provisional Application No. 61/488,554, filed May 20, 2011, the disclosure of which is incorporated by reference in its entirety.

BACKGROUND

A machine translator can be used to automatically translate a phrase from one source language to another target language. One mechanism for doing so uses a phrase table that specifies mappings from source phrases in one language to target phrases in another language. There may be several ways to translate a given word and the phrase table can include each of these mappings. Each source-target pair can be associated in the phrase table with one or more attributes such as the probability with which that particular mapping has been used, the number of times that mapping has been used, etc. An example of a phrase table entry is shown in Table 1.

TABLE 1

| Source | Target | Count | Probability |
| --- | --- | --- | --- |
| capital Washington | Hauptstadt Washington | 27 | 0.6 |

In the above table, the English source phrase "capital Washington" is translated to German target phrase "Hauptstadt Washington." The count value signifies that 27 such translations were found in the training data, and that the training procedure assigned a probability of 0.6 to this translation; a probability of 0.4 is assigned to translations into other phrases (not shown).

Table 2 shows a phrase table where the same English source phrase may be translated into several different German target phrases, along with their associated counts and probabilities.

TABLE 2

| Source (English) | Target (German) | Count | Probability |
| --- | --- | --- | --- |
| Hello | Hallo | 8000 | 0.4 |
| Hello | Guten Tag | 300 | 0.1 |
| Hello | Servus | 17 | 0.02 |

Automatic machine translation training procedures can cause translators to generate incorrect or less desirable translation alternatives. Table 3 shows a phrase table with two entries, one of which is correct and the other of which is wrong. The first entry properly translates the English "capital Washington" to the German "Hauptstadt Washington." The second entry incorrectly translates the same English phrase to the German "Hauptstadt Moskau."

TABLE 3

| Source (English) | Target (German) | Count | Probability |
| --- | --- | --- | --- |
| capital Washington | Hauptstadt Washington | 27 | 0.6 |
| capital Washington | Hauptstadt Moskau | 3 | 0.1 |

It is desirable to improve automatic machine translation.

SUMMARY

Techniques for identifying wrong or less desirable translations is described that uses at least one phrase pair having a source phrase in a first language and a target phrase in a second language. A test phrase pair is received, including a test source phrase and a test target phrase. At least one primary phrase is determined, which is a primary source phrase, a primary target phrase, or both. The primary source phrase along with the test target phrase is at least part of a primary source phrase pair that can also have at least a primary source score. The primary target phrase along with the test source phrase is at least part of a primary target phrase pair that can also have at least a primary target score. At least one primary phrase is compared with at least one test phrase and a machine translator can be modified based upon the results of the comparison.

BRIEF DESCRIPTION OF THE DRAWINGS

The accompanying drawings, which are included to provide a further understanding of the invention, are incorporated in and constitute a part of this specification; illustrate embodiments of the invention and together with the detailed description serve to explain the principles of the invention. No attempt is made to show structural details of the invention in more detail than may be necessary for a fundamental understanding of the invention and various ways in which it may be practiced.

DETAILED DESCRIPTION

In a translator, it is often necessary to determine the quality of a given translation, such as an entry in a phrase table. The quality of a translation can relate to the correctness and/or the desirability of the translation. Accordingly, embodiments of the disclosed subject matter provide techniques for determining the correctness and/or desirability of a translation. The translator can be modified to prevent an incorrect and/or less desirable translation from being used or modify the way in which a translation is used. For example, a given translation may be undesirable to be used in one context, but be preferred for another context.

Embodiments of the described subject matter can be implemented for translating a phrase from any first language into any second language. A "phrase" can include any number of words, numbers, characters, punctuation or other such entities or combination thereof and can be associated with structures and/or additional information (e.g., attributes, etc.) such as hierarchies, rules, parse trees, part-of-speech tags, counts, probabilities, semantic categories, etc., or combination thereof. In some cases, such as a thesaurus application, the first and second language may be the same. For the purpose of illustration only, examples are considered that translate words from English to German. These examples are meant to illustrate, and not to limit, the scope of the claims.

In an illustrative example, a machine translator includes a mechanism for mapping the English language phrase "Washington" into its German equivalent. Such a mapping can be, but is not limited to, an entry in a phrase table. As an example, one of the entries in the phrase table for this translation is shown in Table 4. This entry can be evaluated to determine if it is likely to be a correct or incorrect (or more or less desirable) translation in accordance with embodiments disclosed herein. The entry to be evaluated is labeled the test phrase pair 110 in Table 4. The test phrase pair can include a test source phrase in a first language that is mapped to the test target phrase in a second language. In this example, the test source phrase is "Washington" and the test target phrase is "Moskau". The count for the translation is 3 and the probability is 0.1.

TABLE 4

| | Source Phrase | Target Phrase | Count | Probability |
|---|---|---|---|---|
| Test Phrase Pair | Washington | Moskau | 3 | 0.1 |
| Primary Source Phrase Pair | Moscow | Moskau | 18 | .7 |
| Primary Target Phrase Pair | Washington | Washington | 27 | 0.6 |

Figure 1:
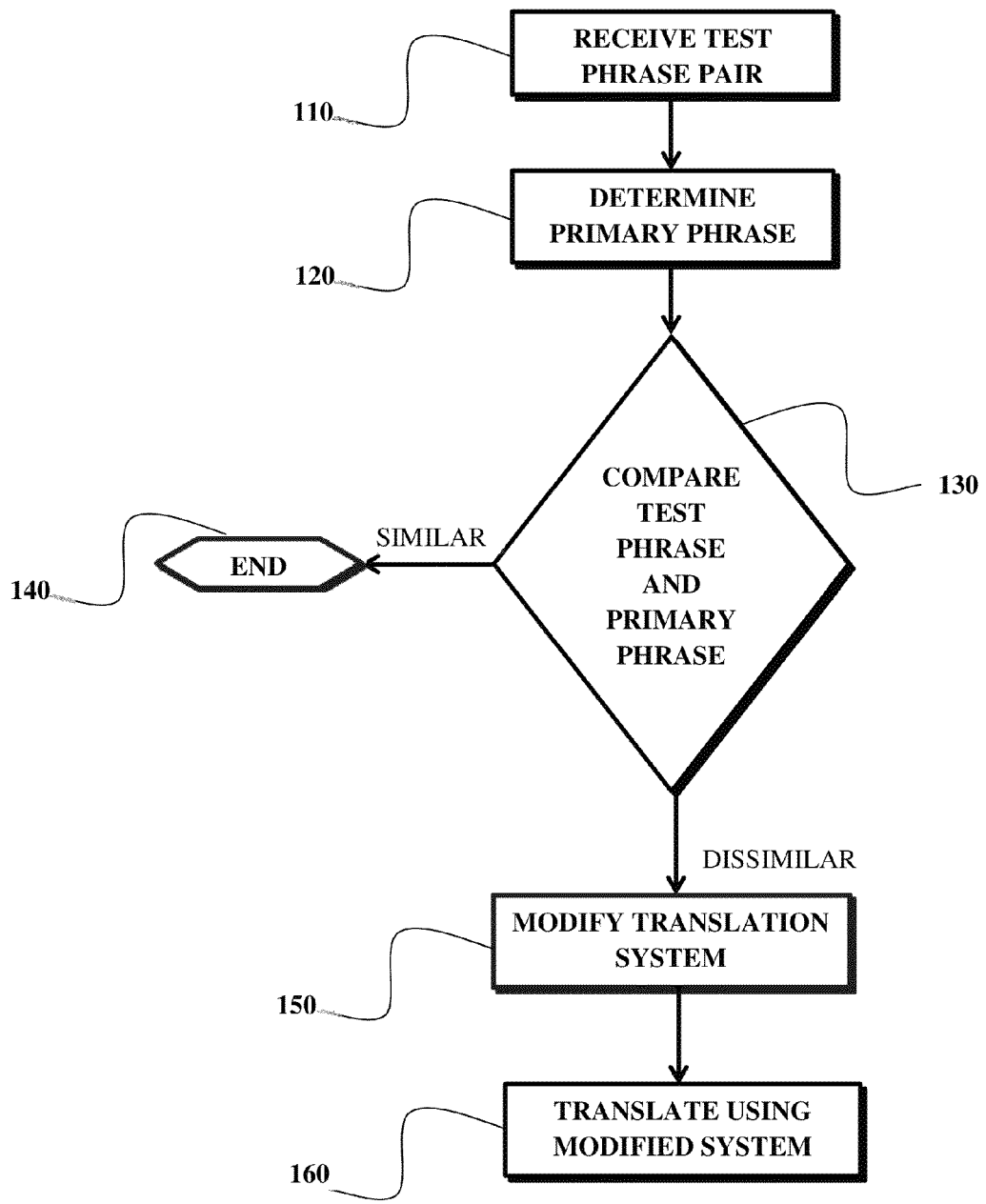
FIG. 1 is a flow chart explaining a basic structure of a machine translator.

As shown in FIG. 1, the machine translator receives the test phrase pair 110. In accordance with embodiments of the disclosed subject matter, a primary phrase 120 can be determined to help evaluate the test phrase pair 110. An example of a primary phrase includes the best translation (e.g., highest probability, highest count, etc.) of the test source phrase in the dataset. This is an example of a primary target phrase. Another example of a primary phrase includes the best back-translation of the test target phrase, i.e., the source phrase of the highest scoring entry in the dataset having the test target phrase. This primary source phrase can be the most likely phrase that is translated to the given test target phrase.

More generally, a primary phrase can be a primary source phrase or a primary target phrase. The primary source phrase can be the source phrase of a phrase pair (the primary source phrase pair) having the test target phrase as the target phrase and a score at least equal to a primary source score. For example, the primary source phrase pair may be a phrase pair (*, test_target_phrase, count >50), where * is a wildcard that can represent a source phrase and primary source score is the count, which in this example must be over 50. Another example can be (*, test_target_phrase, probability >0.7). Yet another example is (*, test_target_phrase, highest score), where the score for the pair must be the highest score of any such pair in the dataset. Still another example requires the pair to meet a combination of criteria, such as (*, test_target_phrase, count >75 and probability >0.8). The primary source phrase pair shown in Table 4 is the pair (*, test_target_phrase) with the highest probability score in the data set. The primary source phrase in Table 4 is "Moscow". This example indicates that "Moskau" is the phrase most often translated from the English term "Moscow" by the machine translator.

Likewise, a primary target phrase can be determined in accordance with embodiments of the disclosed subject matter. The primary target phrase can be the target phrase of a phrase pair (the primary target phrase pair) having the test source phrase as the source phrase and that has a score at least equal to a primary target score. For example, the primary target phrase pair may be a phrase pair (test_source_phrase, *, count >800), where * is a wildcard that can represent a target phrase and the count of the pair must be over 800. Another example can be (test_source_phrase, *, probability >0.9). Yet another example can be (test_source_phrase, highest score), where highest score is the highest score of the pair relative to all other such pairs in the data set. Another example can require the primary target phrase pair to meet a combination of criteria, such as (test_source_phrase, *, count >2100 and probability >0.8). The primary target phrase pair shown in Table 4 is the pair (test_source_phrase, *) with the highest probability score in the data set. This example indicates that "Washington" is the German phrase to which the English phrase "Washington" is most often translated by the machine translator.

The scoring technique used to select the primary source phrase need not be the same as the scoring technique used to select the primary target phrase. For example, the primary source may be selected based on the pair with the highest count (test_source_phrase, highest count) whereas the primary target phrase may be selected based on the pair with the highest probability (test_source_phrase, highest probability). Furthermore, the primary source and target phrase scoring and selection may be done using a one directional phase table, for example from English to German, or a bidirectional phrase table, for example from English to German and from German to English.

The score used to determine a primary phrase can be determined using a variety of factors including, but not limited to, one or more of the highest count in the training data, the highest probability of the given translation, a human ranking of the pair, a ROUGE score (e.g., a technique that compares the automatically produced translation against a reference or a set of references or translations), a BLEU score (e.g., a technique that compares the translation with a set of good quality reference translations), the probability of translation in target to source language direction, the number of words in the translation, the occurrence of particular sub-phrases in the phrase pair, or any other applicable criteria or a combination thereof.

A one directional phase table may be used to determine the primary source phrase. In the example above, the applicable one directional phase table used is from English to German. A phase table operating in the opposite direction, such as from German to English, could also be used to find a primary source phrase.

As shown in FIG. 1, upon obtaining a primary phrase, the primary phrase can be used to evaluate the test pair by comparing the primary phrase to a test phrase for similarity 130. If the phrases are sufficiently similar 140, then the test phrase pair may be a correct translation. If the phrases are sufficiently different 150, then the test phrase pair may be considered a bad or less desirable translation. If the comparison reveals that the primary phrase is sufficiently different than the test phrase, the machine translation technique can be modified to prevent or diminish the likelihood that the bad or less desirable test phrase pair is used in translation. For example, the test phrase can be deleted from the data set, it can be flagged (e.g., for human evaluation), its scores can be altered, etc. The machine translation technique is accordingly modified based on the result of the comparison.

Figure 2A:
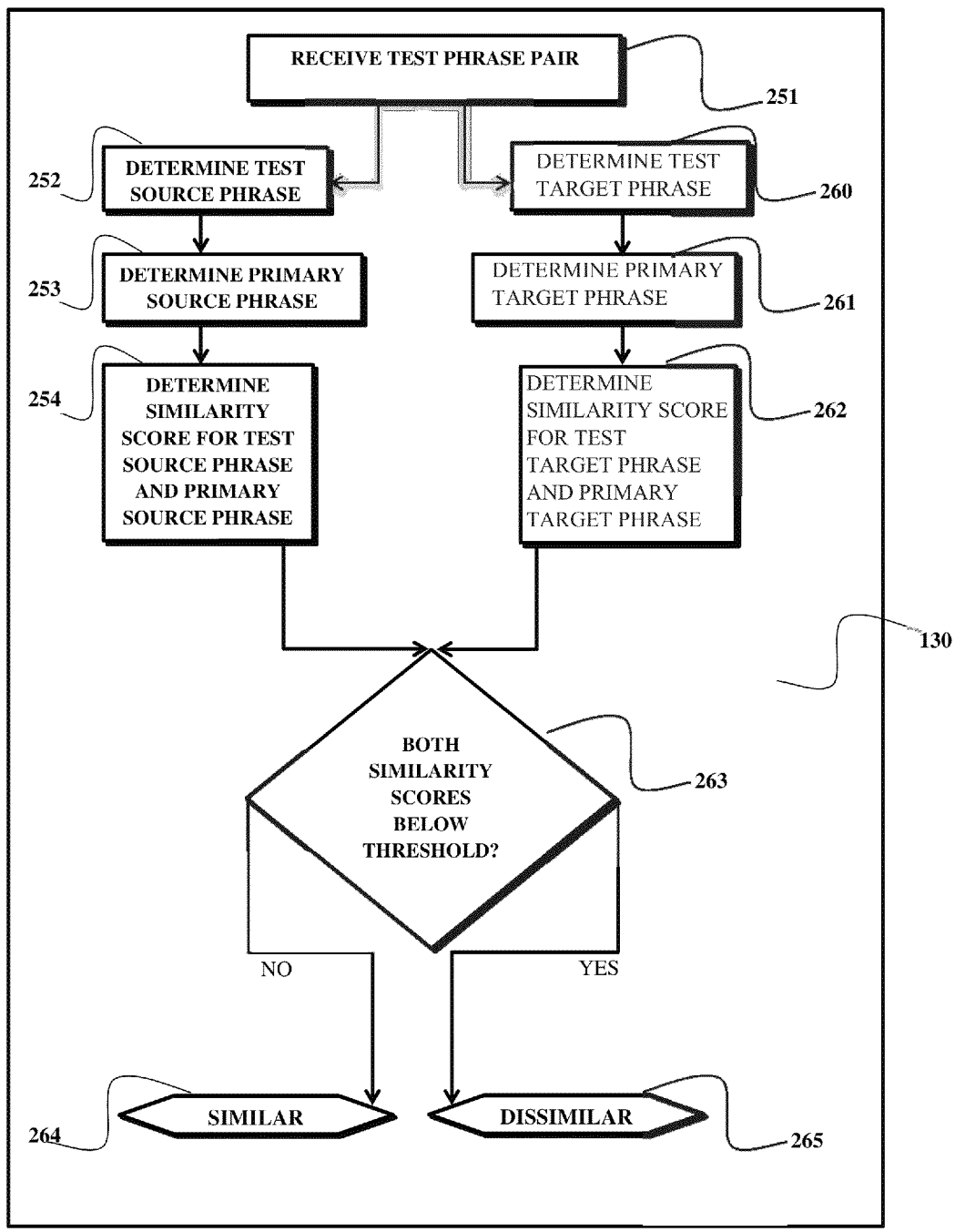
FIG. 2a is a flow chart explaining an example of a comparison of a test phrase and a primary phrase in a machine translator.
Figure 2B:
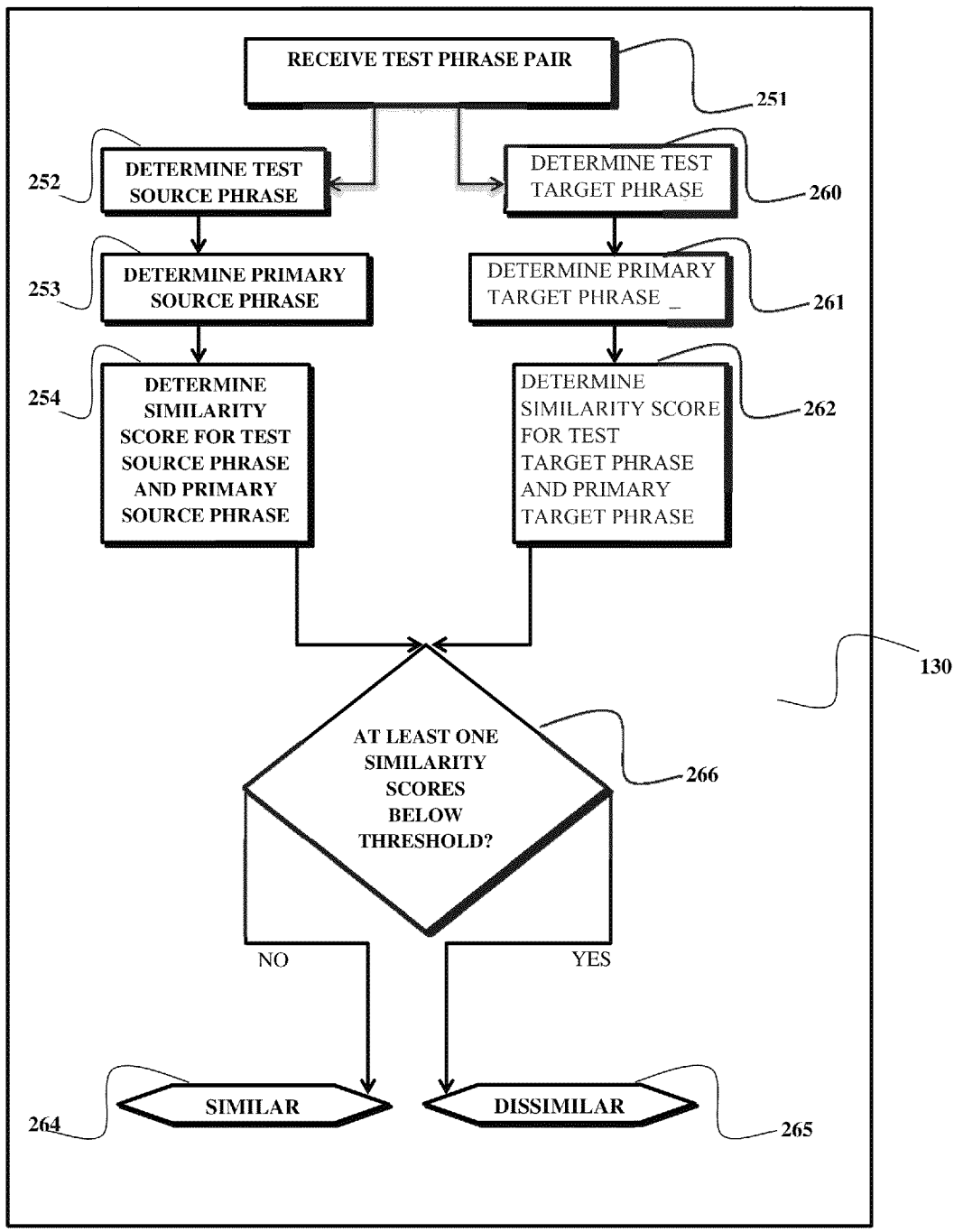
FIG. 2b is a flow chart explaining another example of a comparison of a test phrase and a primary phrase in a machine translator.

In particular, as shown in FIG. 2a and FIG. 2b, once the test phrase pair 251 received, the primary source phrase 253 can be compared to the test source phrase 252. For example, the primary source phrase 253 can represent the best translation to the test target phrase and can be compared 254 to the test source phrase 252. If the primary source and test source are similar 264, it can indicate that the test source is a variant of the best source phrase and the translation may be good. If it is very different 265, it may indicate that the translation may be bad or less desirable. Likewise, the primary target phrase 261 can represent the most likely translation of the test source phrase. If 263 the primary target 261 and the test target 260 are similar 264, it can indicate that the test target is a variant of the best target phrase and the translation may be good. Otherwise, it may be bad or less desirable 265. In some embodiments, as shown in FIG. 2a, of the described subject matter, the test pair can be considered bad or less desirable only if both the primary source phrase is sufficiently different than the test source phrase and the primary target phrase is sufficiently different than the test target phrase 263. In other embodiments, as shown in FIG. 2b, the test pair can be considered bad or less desirable if either the primary source phrase is sufficiently different than the test source phrase or the primary target phrase is sufficiently different than the test target phrase 266.

The determination of similarity between a primary phrase and a test phrase can be made using a variety of scoring techniques including, but not limited to, calculating the edit distance (for example the Levenshtein distance) between the phrases (for example, measuring the number of "edits" that are necessary to transform one phrase into another; "edits" can include removing a character, adding a character, replacing a character, swapping positions, etc.), using weighted edit distances that puts more weight on some characters or words and less on others (e.g. ignoring punctuation, only using letters, etc.), using semantic similarity measures, using automatic clustering results, or any other measure that determines similarity between phrases or a combination of measures thereof.

In the example shown in Table 4, the test source phrase "Washington" is compared with the primary source phrase "Moscow" which is not identical or similar, indicating that the translation may be incorrect or less desirable. The technique may also compare the test target phrase with the primary target phrase. In the example shown in Table 4, the Test target phrase "Moskau" is compared with the primary target phrase "Washington" which is not identical or similar and also indicates that the translation may be incorrect or less desirable. Based on the result of the comparison, the technique may modify the test pair by deleting it from the machine translation technique, by modifying the test pair by changing its count, probability, or any other applicable metric or combination thereof. The test pair may also be included as the input for a machine-learned classifier that decides if phrase pairs are correct or incorrect or more or less desirable. Any other applicable modification, such as a modification based upon the output of the machine-learned classifier may also be employed. The machine translator may then translate a phrase differently after the modification than before 160. In this example, the translator may translate the phrase "Washington" to "Moscow" before the modification in accordance with the disclosed subject matter and translate "Washington" to "Washington" after the modification.

In another illustrative example of the disclosed subject matter, a machine translator translates the English language phrase "Germany" to its German equivalent. There can be several entries in a phrase table for this translation, several of which are shown as the test phrase pair in Table 5. In this example, the test source phrase is "Germany" and the test target phrase is "Deutschlands". The count for the translation is 2000 and the probability is 0.1.

TABLE 5

| | Source Phrase (English) | Target Phrase (German) | Count | Probability |
|---|---|---|---|---|
| Test Phrase Pair | Germany | Deutschlands | 2000 | 0.1 |
| Primary Source Phrase Pair | Germany's | Deutschlands | 10000 | 0.9 |
| Primary Target Phrase Pair | Germany | Deutschland | 20000 | 0.8 |

As stated in the previous example, a primary phrase can be determined to help evaluate the test phrase pair. A primary phrase can be a primary source phrase or a primary target phrase. The primary source phrase can be the source phrase of a phrase pair (the primary source phrase pair) having the test target phrase as the target phrase and that has a score at least equal to a primary source score. The primary source phrase pair shown in Table 5 is the pair (*, test_target_phrase) with the highest probability score in the data set. The primary source phrase in Table 5 is "Germany's". This example indicates that "Deutschlands" is the phrase most often translated from the English term "Germany's" by the machine translator.

Likewise, as disclosed in the previous example, a primary target phrase can be determined to help evaluate the test phrase pair. The primary target phrase can be the target phrase of a phrase pair (the primary target phrase pair) having the test source phrase as the source phrase and that has a score at least equal to a primary target score. The primary target phrase pair shown in Table 5 is the pair (test_source_phrase, *) with the highest probability score in the data set. This example indicates that "Deutschland" is the German phrase to which the English phrase "Germany" is most often translated by the machine translator.

The score used to determine a primary phrase can be determined using a variety of factors including, but not limited to, one or more of the highest count in the training data, the highest probability of the given translation, a human ranking of the pair, a ROUGE[is it rogue or rouge?] score, or any other applicable criteria or a combination thereof.

As shown in FIG. 2a and FIG. 2b, upon obtaining a primary phrase, the primary phrase can be compared to a test phrase to determine if the test phrase pair is valid 263, 266. The primary phrase and test phrase can be evaluated for similarity 254, 262. If the phrases are sufficiently similar 264, then the test phrase pair may be good and the machine translator can validate the use of the test phrase pair. Additionally, in response to a good test phrase pair, the machine translator may modify an attribute associated with the test pair, including but not limited to, increasing the count value or probability associated with the test phrase pair.

The determination of similarity between a primary phrase and a test phrase can be made using a variety of scoring techniques including, but not limited to, calculating the edit distance (for example, the Levenshtein distance) between the phrases (for example, measuring the number of "edits" that are necessary to transform one phrase into another; "edits" can include removing a character, adding a character, replacing a character, swapping positions, etc.), using weighted edit distances that puts more weight on some characters or words and less on others (e.g. ignoring punctuation, only using letters, etc.), using semantic similarity measures, using automatic clustering results, or any other measure that determines similarity between phrases or a combination of measures thereof. In the example shown in Table 5, the test source phrase "Germany" is compared with the primary source phrase "Germany's" which is not identical but may be sufficiently similar to "Germany". Based on the result of the comparison, a determination may be made that the test pair is a good translation and make no modifications to the machine translator. Alternatively, the test pair may be flagged to be included as an input for a machine-learned classifier that decides if phrase pairs are correct or incorrect or more or less desirable, for human review, etc.

The techniques may also compare the test target phrase with the primary target phrase. In the example shown in Table 5, the Test target phrase "Deutschlands" is compared with the primary target phrase "Deutschland" which is not identical but may be sufficiently similar to "Deutschlands". This also indicates that the test pair may be a good translation. Alternatively, the test pair may be flagged to be included as an input for a machine-learned classifier that decides if phrase pairs are correct or incorrect or more or less desirable, for human review, etc.

Embodiments in accordance with the disclosed subject matter may determine that the test pair is a good translation and not make any modifications if either comparison indicates that a primary phrase is identical or similar to a test phrase, even if the other comparison indicates a substantial difference. Alternatively, embodiments may make modifications if only one comparison indicates dissimilarity under certain conditions. Yet other embodiments may make modifications even if both comparisons are identical or similar.

Embodiments in accordance with the described subject matter may be used to evaluate any translation mappings and may be especially useful for mappings that contain test phrases that are named entities (e.g., names, locations, organizations, etc.), terms of art, special jargon, etc. Testing for named entities may be done by matching against a list of named entities or by any other technique of named entity recognition. Similar procedures can be used for testing terms of art and jargon phrases.

In accordance with embodiments of the described subject matter, a translation can be evaluated to determine if it is more or less desirable to be used. Based upon the results of the evaluation, one or more attributes associated with a translation (e.g., a phrase pair in a phrase table) can be modified to change the behavior of a machine translator. For example, a machine learned classifier could generate a score or other attributes for an entry in a phrase table that indicates the desirability of the entry and/or that can be used by the machine translator to select the entry based upon the context of the desired translation. In one example, an entry in a phrase table may have the English source phrase "Mr. Alfred Newman" and the German target phrase "Herr Newman". While this target phrase may be desirable in some contexts, it may be less desirable in other contexts than the full name "Herr Alfred Newman". The described subject matter can modify the entry such that the machine translator only selects this entry to be used in the appropriate context in which the shorter translation is desirable.

A machine translator in accordance with the described subject matter can include a machine translation server having a processor and a memory coupled to the processor. The memory can store software instructions adapted to be executed by the processor to perform at least some of the steps of the technique in accordance with the described subject matter. For example, the software instructions may be adapted to be executed by the processor to receive a test phrase pair, determine at least one primary phrase, compare at least one primary phrase to at least one test phrase for similarity and modify translation mappings that can be stored in memory or in a translation mapping database with which the machine translation server is in communication.

More generally, various embodiments may include or be embodied in the form of computer-implemented processes and components for practicing those processes. Embodiments also may be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes a machine for practicing the described subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes a machine for practicing the described subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the technique in accordance with the described subject matter in hardware and/or firmware. The processor may be coupled to memory, such as RAM, ROM, flash memory, a hard disk or any other device capable of storing electronic information. The memory may store instructions adapted to be executed by the processor to perform the technique in accordance with an embodiment of the described subject matter.

Any of the functionality described herein may be implemented by modules, which can be software, hardware and/or a combination thereof. A module can perform a single function, multiple functions or a function may be partially performed by each of a number of modules. For example, test phrase pairs may be received by a test phrase receiving module in communication with a primary phrase module that accepts as inputs the test target phrase to determine the primary source phrase and the test source phrase to determine the primary target phrase. The primary phrase module may be in communication with a comparator module that measures the similarity between the test source phrase and primary source phrase and the test target phrase and primary target phrase. The result of the comparisons can be passed to a modification module, which can modify the test phrase and/or some or all of its attributes in memory or in the translation phrase database.

Figure 3:
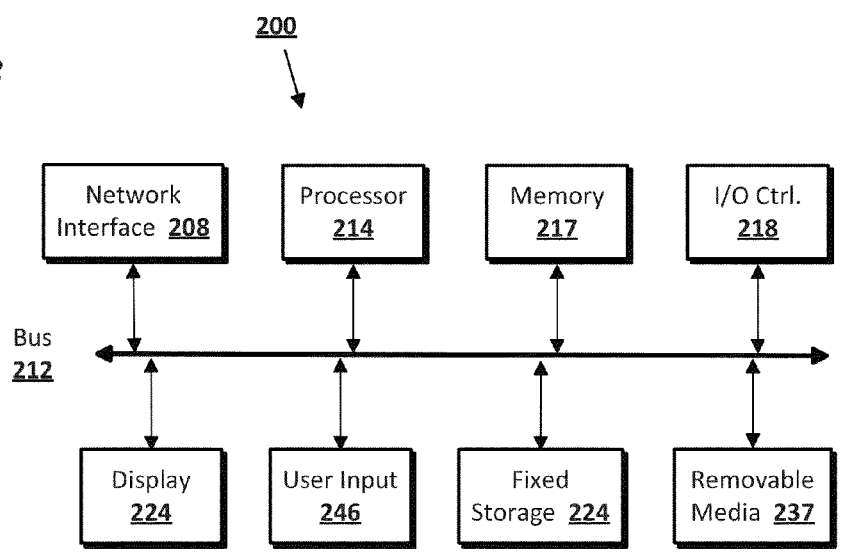
FIG. 3 is a diagram of a computer.

The architecture of a device that can embody the disclosed subject matter is shown in FIG. 3. Computer 200 includes a bus 212 which interconnects major components of the computer 210, such as a central processor 214, a memory 217 (typically RAM, but which may also include ROM, flash RAM, or the like), an input/output controller 218, a user display 224, such as a display screen via a display adapter, a user input component, which may include one or more controllers and associated user input devices such as a keyboard, mouse, and the like, fixed storage 224, such as a hard drive, flash storage, Fibre Channel network, SCSI device, and the like, and a removable media component 237 operative to control and receive an optical disk, flash drive, and the like.

The bus 212 allows data communication between the central processor 214 and the memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 200 are generally stored on and accessed via a computer readable medium, such as a hard disk drive (e.g., fixed storage 224), an optical drive, floppy disk, or other storage medium 237.

The fixed storage 224 may be integral with the computer 200 or may be separate and accessed through other interfaces. The network interface 208 may provide a direct connection to a remote server via a telephone link, to the Internet via an Internet Service Provider (ISP), or a direct connection to a remote server via a direct network link to the Internet via a POP (point of presence) or other technique. The network interface 208 may provide such connection using wireless techniques, including digital cellular telephone connection, Cellular Digital Packet Data (CDPD) connection, digital satellite data connection or the like.

Many other devices or components (not shown) may be connected in a similar manner (e.g., document scanners, digital cameras and so on, which can be sources of text for translation, sources of translation data, etc.). Conversely, all of the devices shown in FIG. 3 need not be present to practice the present disclosure. The devices and components can be interconnected in different ways from that shown. The operation of a computer such as the computer 200 is readily known in the art and is not discussed in detail in this application. Code to implement the present disclosure can be stored in computer-readable storage media such as one or more of memory 217, fixed storage 224, removable media 237, or on a remote storage location.

Various embodiments of the presently disclosed subject matter may include or be embodied in the form of computer-implemented processes and components for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes a machine for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes a machine for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the technique in accordance with embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the technique in accordance with an embodiment of the disclosed subject matter.

Examples and figures provided herein are merely illustrative and are not meant to be an exhaustive list of all possible embodiments, applications, or modifications of the described subject matter. Thus, various modifications and variations of the described techniques and configurations of the described subject matter will be apparent to those skilled in the art without departing from the scope and spirit of the described subject matter.

Although the subject matter herein has been described in connection with specific embodiments, it should be understood that the described subject matter as claimed should not be unduly limited to such specific embodiments. Indeed, various modifications of the described modes for carrying out the described subject matter which are obvious to those skilled in the relevant arts or fields are intended to be within the scope of the appended claims.

What is claimed is:

1. A translation method using at least one phrase pair having a source phrase in a first language and a target phrase in a second language, comprising:
   receiving a test phrase pair including a test source phrase and a test target phrase;
   determining a primary source phrase that is the source phrase of a phrase pair having the test target phrase as the target phrase and the highest selection score;
   determining a primary target phrase that is the target phrase of a phrase pair having the test source phrase as the source phrase and the highest selection score;
   comparing the primary source phrase to the test source phrase;
   comparing the primary target phrase to the test target phrase;
   generating, by a machine learned classifier, a score for the test phrase based upon the comparing the primary source phrase to the test source phrase and the comparing the primary target phrase to the test target phrase;
   modifying the machine translation system based upon the score generated by the machine learned classifier; and
   translating a phrase from a first language to a second language in accordance with the modified translation system.

2. A translation method using at least one phrase pair having a source phrase in a first language and a target phrase in a second language, comprising:
   receiving, at a computer having one or more processors, a test phrase pair including a test source phrase and a test target phrase;
   determining, at the computer, at least one primary phrase including at least one of a primary source phrase, a primary target phrase, or both, based upon a primary source score, a primary target score, or both, wherein the primary source phrase with the test target phrase comprises a primary source phrase pair that has a score equal to at least the primary source score, and the primary target phrase with the test source phrase comprises a primary target phrase pair that has a score equal to at least the primary target score;

comparing, at the computer, the at least one primary phrase with the at least one test phrase; and modifying a machine translation system based upon the results of the comparing the at least one primary phrase with the at least one test phrase.

3. The method of claim 2, wherein the comparing the at least one primary phrase with the at least one test phrase comprises comparing the primary source phrase with the test source phrase.

4. The method of claim 2, wherein the comparing the at least one primary phrase with the at least one test phrase comprises comparing the primary target phrase with the test target phrase.

5. The method of claim 2, wherein comparing the at least one primary phrase with the at least one test phrase comprises determining the difference between the at least one primary phrase with the at least one test phrase.

6. The method of claim 5, wherein determining the difference between the at least one primary phrase and the at least one test phrase comprises determining the edit distance between the at least one primary phrase and the at least one test phrase.

7. The method of claim 5, wherein determining the difference between the at least one primary phrase and the at least one test phrase comprises utilizing a semantic similarity measure.

8. The method of claim 2, wherein the primary source score is the highest score among phrase pairs having the test target phrase as the target phrase.

9. The method of claim 2, wherein the primary target score is the highest score among phrases having the test source phrase as the source phrase.

10. The method of claim 2, wherein comparing the at least one primary phrase with the at least one test phrase comprises determining at least one similarity score between the at least one primary phrase and the at least one test phrase and modifying a machine translation system based upon the results of the comparing the at least one primary phrase with the at least one test phrase comprises modifying the test phrase pair based upon the determination that at least one similarity score is less than a similarity score threshold.

11. The method of claim 2, wherein comparing the at least one primary phrase with the at least one test phrase comprises determining a primary source similarity score between the primary source phrase and the test source phrase and determining a primary target similarity score between the primary target phrase and the test target phrase and modifying a machine translation system based upon the results of the comparing the at least one primary phrase with the at least one test phrase comprises modifying the test phrase based upon the determination that the primary source similarity score is less than a primary source similarity score threshold and that the primary target similarity score is less than a primary target similarity score threshold.

12. A device comprising:
a database storing a test phrase pair including a test source phrase and a test target phrase;
a processor in connection with said database, said processor configured to:

receive said test phrase pair including a test source phrase and a test target phrase;

determine at least one primary phrase including at least one of a primary source phrase, a primary target phrase, or both, based upon a primary source score, a primary target score, or both, wherein the primary source phrase with the test target phrase comprises a primary source phrase pair that has a score equal to at least the primary source score, and the primary target phrase with the test source phrase comprises a primary target phrase pair that has a score equal to at least the primary target score;

compare the at least one primary phrase with the at least one test phrase; and modify a machine translation system based upon the results of the comparison of the at least one primary phrase with the at least one test phrase.

13. The device of claim 12, wherein the comparison of the at least one primary phrase with the at least one test phrase comprises a comparison of the primary source phrase with the test source phrase.

14. The device of claim 12, wherein the comparison of the at least one primary phrase with the at least one test phrase comprises a comparison of the primary target phrase with the test target phrase.

15. The device of claim 12, wherein the comparison of the at least one primary phrase with the at least one test phrase comprises a determination of the difference between the at least one primary phrase with the at least one test phrase.

16. The device of claim 15, wherein the determination of the difference between the at least one primary phrase and the at least one test phrase comprises a determination of the edit distance between the at least one primary phrase and the at least one test phrase.

17. The device of claim 12, wherein the primary source score is the highest score among phrase pairs having the test target phrase as the target phrase.

18. The device of claim 12, wherein the primary target score is the highest score among phrases having the test source phrase as the source phrase.

19. The device of claim 12, wherein the comparison of the at least one primary phrase with the at least one test phrase comprises a determination of at least one similarity score between the at least one primary phrase and the at least one test phrase and a modification of a machine translation system based upon the results of the comparison of the at least one primary phrase with the at least one test phrase comprises a modification of the test phrase pair based upon the determination that at least one similarity score is less than a similarity score threshold.

20. The device of claim 12, wherein the comparison of the at least one primary phrase with the at least one test phrase comprises a determination of a primary source similarity score between the primary source phrase and the test source phrase and a determination of a primary target similarity score between the primary target phrase and the test target phrase and a modification of a machine translation system based upon the results of the comparison of the at least one primary phrase with the at least one test phrase comprises a modification of the test phrase based upon the determination that the primary source similarity score is less than a primary source similarity score threshold and that the primary target similarity score is less than a primary target similarity score threshold.

* * * * *